United States Patent [19]

Yokogawa

[11] Patent Number: 5,280,462
[45] Date of Patent: Jan. 18, 1994

[54] DISC PLAYING AND RECORDING APPARATUS HAVING A PAIR OF HEADS CONTROLLED TO PREVENT INTERRUPTIONS DURING PLAY

[75] Inventor: Fumihiko Yokogawa, Saitama, Japan

[73] Assignee: Pioneer Electronic Corporation, Tokyo, Japan

[21] Appl. No.: 617,326

[22] Filed: Nov. 23, 1990

[30] Foreign Application Priority Data

Feb. 23, 1990 [JP] Japan .................................. 2-44225

[51] Int. Cl.⁵ .............................................. G11B 17/22
[52] U.S. Cl. ........................................ 369/30; 369/32; 358/342
[58] Field of Search ...................... 369/54, 30, 32, 13, 369/58, 124, 33, 48; 358/342; 360/114, 59, 86, 73.02, 78.05

[56] References Cited

U.S. PATENT DOCUMENTS

| 4,841,502 | 6/1989 | Murakami et al. | 369/13 |
| 4,845,696 | 7/1989 | Ohtsuki et al. | 369/13 |
| 4,873,679 | 10/1989 | Murai et al. | 369/32 |
| 4,894,814 | 1/1990 | Yamada et al. | 369/30 |
| 4,972,396 | 11/1990 | Rafner | 369/32 |
| 4,982,390 | 1/1991 | Tanaka | 369/30 |
| 4,989,196 | 1/1991 | Ishikawa et al. | 369/54 |

Primary Examiner—Aristotelis Psitos
Assistant Examiner—Thang V. Tran
Attorney, Agent, or Firm—Sughrue, Mion, Zinn, Macpeak & Seas

[57] ABSTRACT

A disk recording and reproducing apparatus in which the recorded information is read by using a pair of heads alternately. When recording information, the minimum recording time for each group is controlled to be longer than the maximum seek time. When reproducing information, the minimum reading time required for a reading operation is controll to be longer than the maximum seek time, in order that the seek operation will be completed during the reading operation.

7 Claims, 8 Drawing Sheets

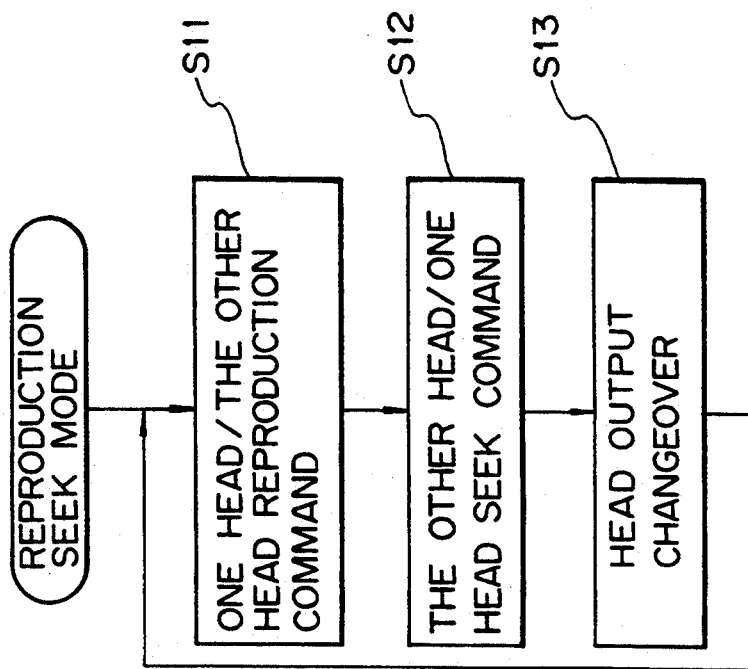

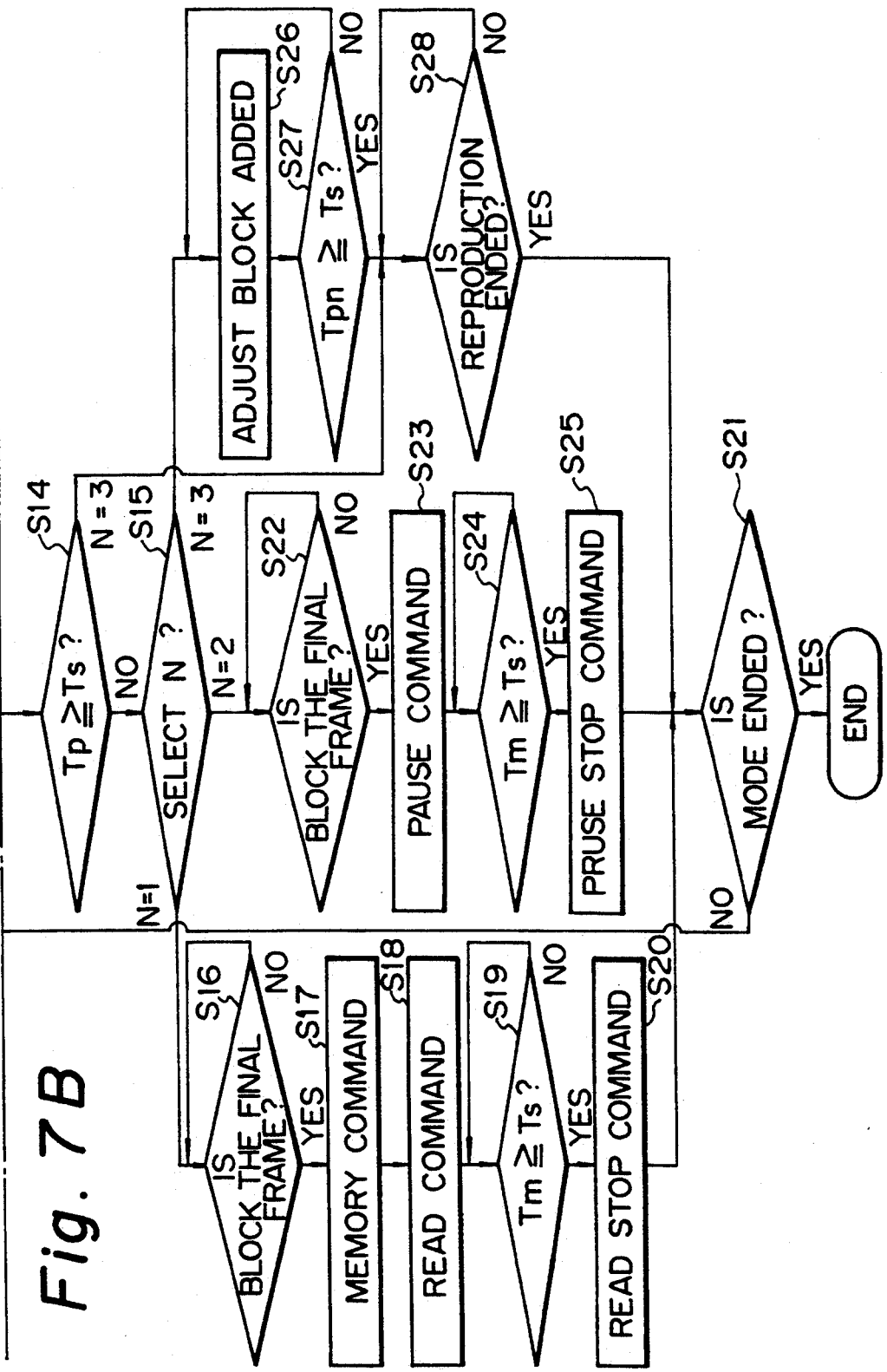

DISC PLAYING AND RECORDING APPARATUS HAVING A PAIR OF HEADS CONTROLLED TO PREVENT INTERRUPTIONS DURING PLAY

BACKGROUND OF THE INVENTION

1. Field of the Invention

The present invention relates to a disk playing and recording/reproducing apparatus.

2. Description of the Prior Art

In a recording/reproducing apparatus of DRAW type or EDRAW type disk, it has been customary to record and reproduce (or erase) by means of a single head.

When, to the contrary, a pair of heads are provided with one of the heads used for erasing and the other head for recording, it is possible to erase and record at real time. Also, if one head is used for reading and the other head is driven to a specified address, and if this operation is alternately repeated and reproducing is performed by alternately using a pair of heads, it is possible to continuously reproduce the desired image in any combination.

When recording, a series of information signals are recorded as one group. If the recording time of the information group, which is being read by one of the heads, is shorter than the access time of the other head (in the case where a pair of heads are used alternately on a recorded disk), then the reading operation of one head is completed during the access operation of the other head. Thus the image reproduction operation is interrupted after the completion of reading by one head until the completion of the access operation of the other head.

SUMMARY OF THE INVENTION

It is an object of the present invention to offer a disk playing and/or recording/reproducing apparatus, by which the image reproduction operation is not interrupted even when the reproduction operation is done while using a pair of heads alternately.

The disk reproducing apparatus according to the present invention is a disk reproducing apparatus to read the recorded information by using a pair of heads alternately, characterized in that the minimum reading time required for one reading operation by a pair of heads is longer than the maximum seeking time of the disk being played.

The disk recording and reproducing apparatus according to the present invention is a disk recording and reproducing apparatus provided with a pair of heads, wherein the information signals are recorded on the disk by using one of said pair of heads. The recorded information is read by using said pair of heads alternately, characterized in that, when a series of information signals are recorded as one group, the minimum recording time for each group is longer than the maximum seek time on the disk in playing.

In the disk playing and recording/reproducing apparatus of this invention, the recorded information is read by using a pair of heads alternately. When reproducing, the minimum reading time required for one reading operation by a pair of heads is longer than the maximum seeking time on the disk in reproducing, and when recording, the minimum recording time for each group is longer than the maximum seek time on the disk in recording.

BRIEF DESCRIPTION OF THE DRAWINGS

FIG. 7($a$-$b$) is a flow chart of the processing procedure in the reproduction seek mode.

BRIEF DESCRIPTION OF A PREFERRED EMBODIMENT

In the following, an embodiment of this invention will be described in detail while referring to the accompanying drawings.

Figure 1:
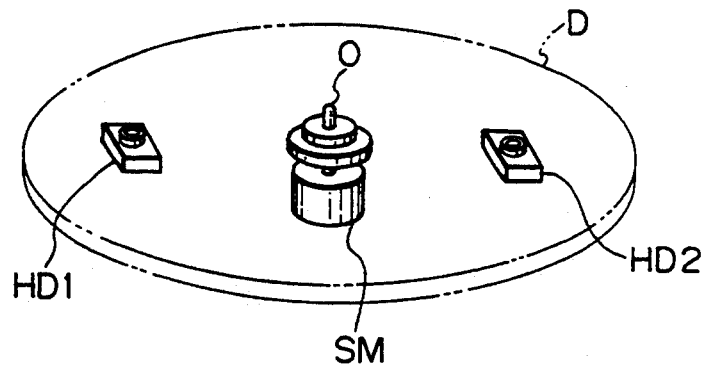
FIG. 1 is a schematical prespective view showing the arrangement of the recording and reproducing unit of the disk recording and reproducing apparatus according to this invention.
Figure 2:
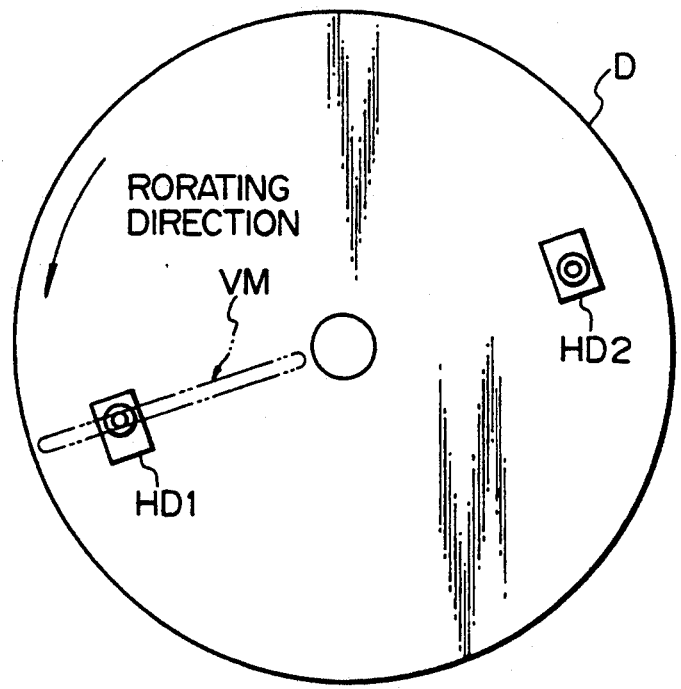
FIG. 2 is a plan view of the same.

As shown in FIG. 1 and FIG. 2, the disk recording and reproducing apparatus of this invention comprises a pair of heads HD1 and HD2, which are preferably placed at approximately symmetrical positions in relation to the rotating central axis O of a spindle motor SM, which drives and rotates the disk D. This pair of heads HD1 and HD2 is used, for example, as a combination recording/erasing head or alternately the pair of heads are used as a reproducing head. As it is evident from FIG. 2, the disk D is provided with a vertical synchronizing mark VM by the mirror unit not to cut the pre-group for each track so that it is aligned along the radial direction of the disk at one point for each rotation of the disk D. As described later, the vertical synchronizing mark VM is detected according to the read RF signals of the heads HD1 and HD2, and the spindle servo is driven so that the detection timing occurs on the predetermined position on the timing axis of the composite image signals (including synchronizing signals such as horizontal synchronizing signal, vertical synchronizing signal, etc.).

Figure 3A:
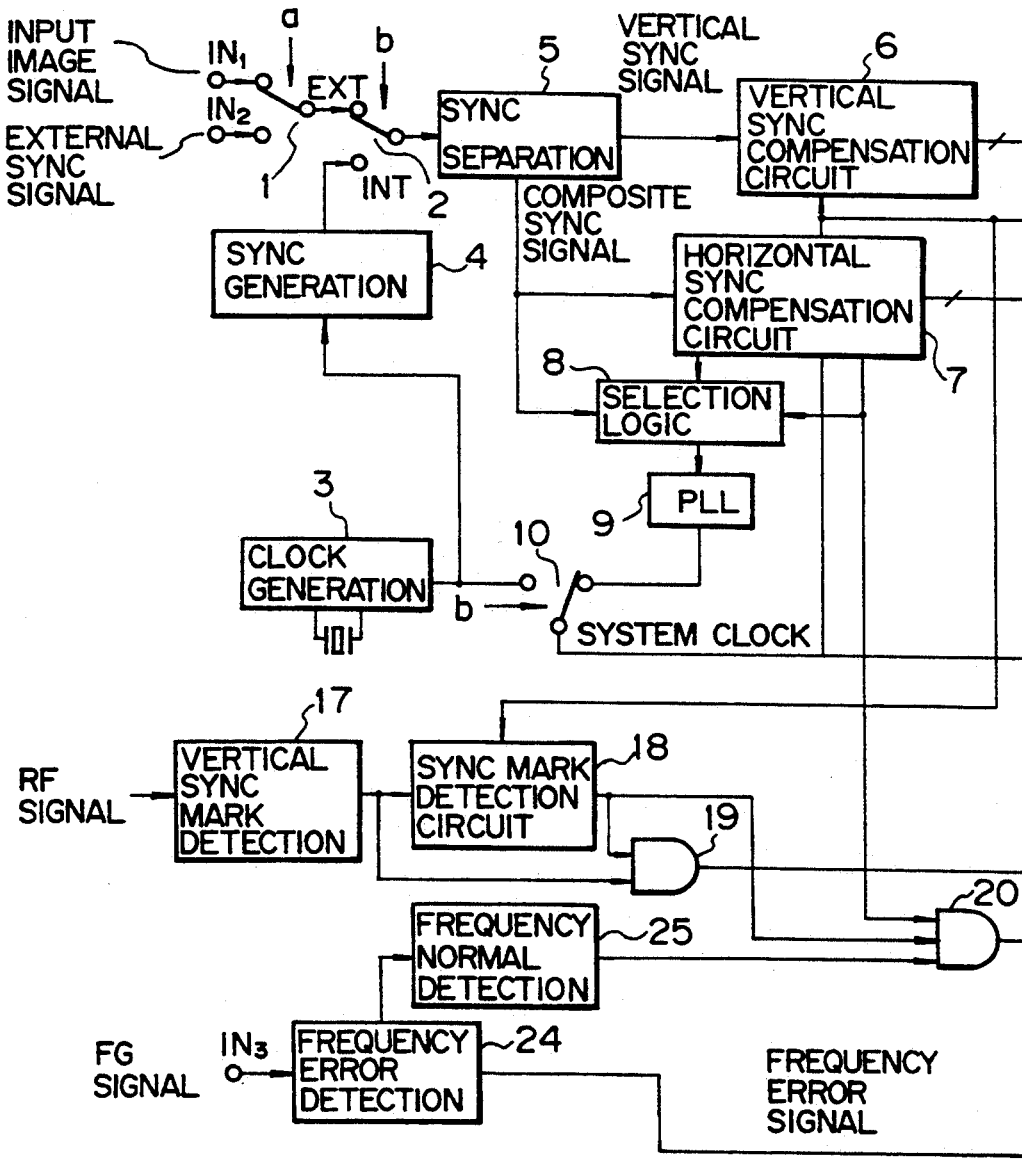
FIGS. 3A, 3B are, when combined, a block diagram of an example of spindle control unit in the disk recording and reproducing apparatus of this invention.
Figure 3B:
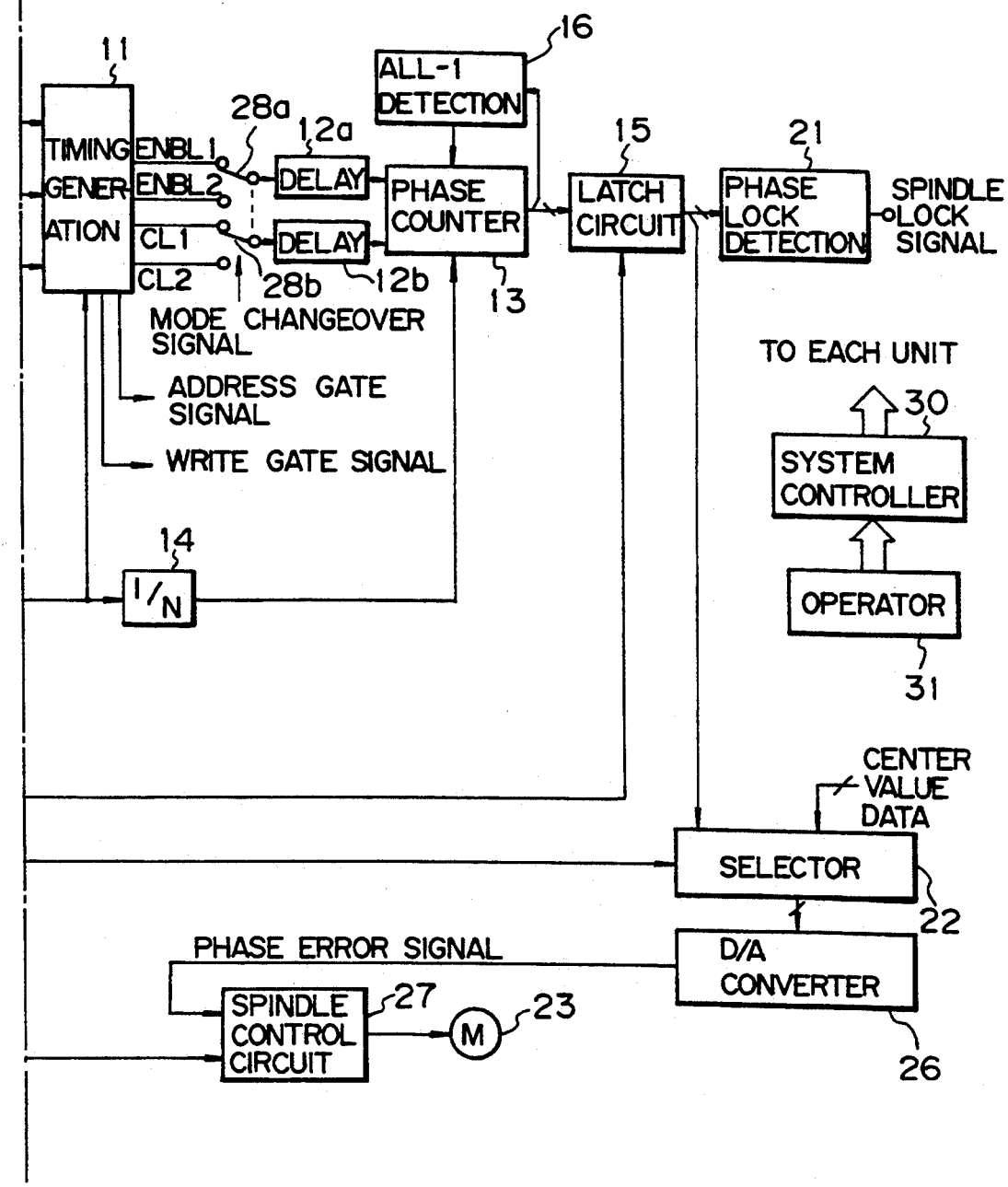

Next, the arrangement of the spindle servo unit in connection with the block diagram of FIGS. 3A, 3B will be described. In FIGS. 3A, 3B, the composite image signal to be recorded is applied on the input terminal IN$_1$, and the external synchronizing signal is applied on the input terminal IN$_2$. These input signals are turned to two input signals at the selector 1. One of them is selected by the changeover control signal issued by the system controller 30, and it is turned to one input of the selector 2. The selector 2 receives at its other input the composite synchronizing signal issued from the synchronizing generation circuit 4 as internal synchronizing signal in accordance with the master clock of the frequency of 4 f sc (f sc: color subcarrier frequency) from clock generation circuit 3. The selector 2 passes therethrough one of the input signals according to the changeover control signal b. That is, the composite image signal is selected when a composite image signal is recorded, the external synchronizing signal is selected during the external synchronizing operation, and the internal synchronizing signal (composite synchronizing signal) is selected during the internal synchronizing operation. The selected signal is supplied to the synchronizing separation circuit 5. In the synchronizing separation circuit 5, the vertical synchronizing signal and composite synchronizing signal are separated from each other. These separated signals are supplied to the vertical synchronizing compensation circuit 6 and the horizontal synchronizing compensation circuit 7 respectively.

The horizontal synchronizing compensation circuit 7 issues a horizontal synchronizing OK signal of high level in synchronizing status when a horizontal synchronizing signal from the composite synchronizing signals is continuously detected for two times or more by an internal counter. At the same time, it is synchronized with the horizontal signal from the count data of the internal counter, and the horizontal synchronizing clock, having a frequency twice as high as the horizontal synchronizing frequency, is generated. The composite synchronizing signal is also supplied to the selection logic 8. The selection logic 8 further receives the horizontal synchronizing OK signal and timing gate signal issued from the horizontal synchronizing compensation circuit 7. When the selection logic 8 does not receive a horizontal synchronizing OK signal, i.e. when it is not in a horizontal synchronizing state, it passes the composite synchronizing signal therethrough without hinderance to a PLL circuit 9. When horizontal synchronizing OK signal is inputted, i.e. during horizontal synchronizing, only the horizontal synchronizing signal is extracted from composite synchronizing signal according to the timing gate signal. This extracted horizontal sync signal is supplied to the PLL circuit 9. The PLL circuit 9 generates the regeneration clock with a frequency of 4 f sc which is synchronized with the horizontal synchronizing signal. The selection logic 8 and actual circuit arrangement of the PLL circuit 9 as well as the circuit operation in the horizontal synchronizing compensation circuit 7 are described in detail in the specification of the Japanese Patent Application No. 1-111343 by the present applicant.

The master clock, having a frequency of 4 f sc, which is generated at the clock generation circuit 3, and the regeneration clock having a frequency of 4 f sc, which is generated at the PLL circuit 9, are turned to two inputs of the selector 10. The master clock from the clock generation circuit 3 is selected by the changeover control signal b during the internal synchronizing operation, and the regeneration clock by PLL circuit 9 is selected during external synchronizing operation. The selected clock is supplied to the horizontal synchronizing compensation circuit 7 and the timing generation circuit 11 as a system clock signal.

Figure 4:
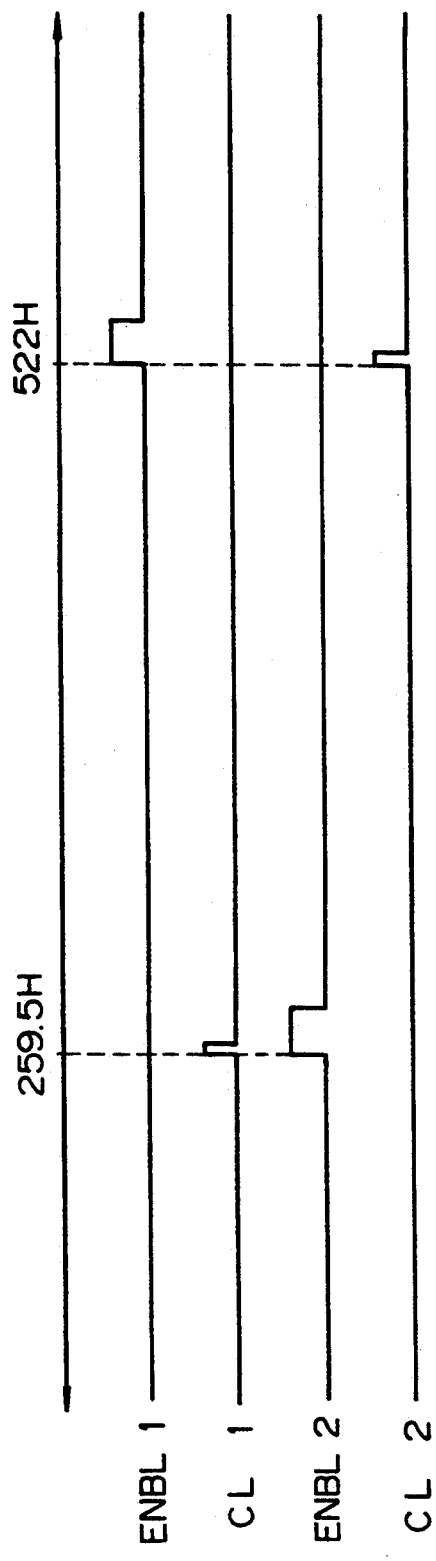
FIG. 4 is a timing chart to show the timing to generate the count enable signals ENBL1 and ENBL2 as well as the clear signals CL1 and CL2.

The count data of the internal counter in the vertical synchronizing compensation circuit 6, the horizontal synchronizing clock produced from horizontal synchronizing compensation circuit 7 and the count data of synchronizing compensation counter as well as system clock are supplied to the timing generation circuit 11. In the timing generation circuit 11, various types of timing signals are generated, such as the count enable signals ENBL1 and ENBL2 and clear signals CL1 and CL2 are output to the phase counter 13. The address gate signals are used to extract the address data contained in the read RF signals, and the write gate signals are used for writing (recording). FIG. 4 shows the generation timing of count enable signals ENBL1 and ENBL2 and clear signals CL1 and CL2. In one frame of image signals, count enable signals ENBL1 and ENBL2 are generated as pulses of several H width at the timing of 525H and the 259.5H, and clear signals CL1 and CL2 are generated at the timing of 259.5H and 525H respectively. The count enable signals ENBL1 and ENBL2 as well as clear signals CL1 and CL2 have time differences corresponding to one field (262.5H) respectively.

The count enable signals ENBL1 or ENBL2 and the clear signals CL1 or CL2 are selected by the changeover switches 28a and 28b. These selected signals are supplied to the phase counter 13 after being delayed by the predetermined delay time at the delay circuits 12a and 12b. The changeover switches 28a and 28b are controlled and changed over by the mode changeover signals, which are issued from the system controller 30 in order to the change the operating mode of the system from one head to the other. The phase counter 13 is turned to the count enable status only when the count enable signals ENBL1 or ENBL2 has a high level. When clear signals CL1 or CL2 is inputted, count data are cleared and set to equal 0. To the phase counter 13, a clock is supplied, which is obtained by N-dividing the system clock at the dividing circuit 14.

The count data of the phase counter 13 is supplied to the latch circuit 15 and the all-1 detection circuit 16. When the count data of the phase counter 13 are detected as all one, all-1 detection circuit 16 issues a hold signal to the phase counter 13. When this hold signal is inputted, phase counter 13 stops the counting operation, and the count data are held at an all-1 status until the next clear signal is inputted.

As already described, the disk is provided with a vertical synchronizing mark VM for each track at one point for each rotation of the disk. This vertical synchronizing mark VM is detected by the vertical synchronizing mark detection circuit 17, which receive RF signals from the heads HD1 or HD2 (See FIG. 1.). The vertical synchronizing mark detection circuit 17 detects the synchronizing mark component contained in the read RF signal and outputs the synchronizing mark detection signal. This synchronizing mark detection signal is supplied to the synchronizing mark detection compensation circuit 18, and at the same time, it is turned to one of the inputs on the 2-input AND gate 19. The synchronizing mark detection compensation circuit 18 has basically the same circuit arrangement as the horizontal synchronizing compensation circuit 7. When the synchronizing mark detection signal is detected with a certain interval of two times or more continuously, the synchronizing mark detection OK signal is output with a high level. The output of the synchronizing mark detection OK signal is stopped when the synchronizing mark detection signal is determined to be lacking for a predetermined window continuously for two times or more. The synchronizing mark detection OK signal is turned to the other input of AND gate 19, and to one input of 3-input AND gate 20. The horizontal synchronizing OK signal outputted from horizontal synchronizing compensation circuit 7 is supplied as another 1 output to the AND gate 20.

When the synchronizing mark detection signal is outputted from the synchronizing mark detection compensation circuit 18, the synchronizing mark detection OK signal passes through AND gate 19 and is supplied to the latch circuit 15 as a latch signal. As the result, count data of phase counter 13 is latched at the detection timing of the vertical synchronizing mark and is supplied to the phase lock detection circuit 21 and the selector 22 as phase data. If the phase data are within the predetermined range, the phase lock detection circuit 21 judges that the phase lock is completed, and the spindle lock signal is outputted. Because 1 horizontal synchronizing section is:

$$1H = fsc \times 2/455 = 4fsc/910$$

and because the clock of phase counter 13 is 4 f sc/N, the resolution of phase control is:

$$\frac{N}{190} H.$$

The spindle motor 23 to drive and rotate the disk is provided with a frequency generator (FG) to detect the rotating speed of the motor, and FG signals outputted as rotating speed data from this frequency generator is supplied to the frequency error detection circuit 24 through the input terminal $IN_3$. The frequency error detection circuit 24 detects the error of the rotating speed of the spindle motor 23 as compared to the standard speed, and the frequency error signal is output to indicate the error. The frequency normal detection circuit 25 detects that the frequency error signal level is within the predetermined range. If it is within the predetermined range, the frequency OK signal is issued as it is normal. This frequency OK signal becomes the remaining 1 input of the 3-input AND gate as described above.

AND gate 20 generates output when all of the synchronizing mark detection OK signal, the horizontal synchronizing OK signal and the frequency OK signal are inputted. This output is turned to the changeover control input of the selector 22. As the result, the selector 22 selects the phase data latched at the latch circuit 15 when the output of AND gate 20 is generated and supplies it to D/A converter 26 of the next step. In all other cases, the data corresponding to the center value of D/A converter 26 is selected and outputted, and the output of D/A converter becomes the phase error signal. Namely, the phase error signal is outputted only when horizontal synchronizing occurs, the vertical synchronizing mark is normally detected and when the FG frequency enters the predetermined range. The frequency error signal and phase error signal are supplied to the spindle control circuit 27, and phase control of the spindle motor 23 is performed.

Figure 5:
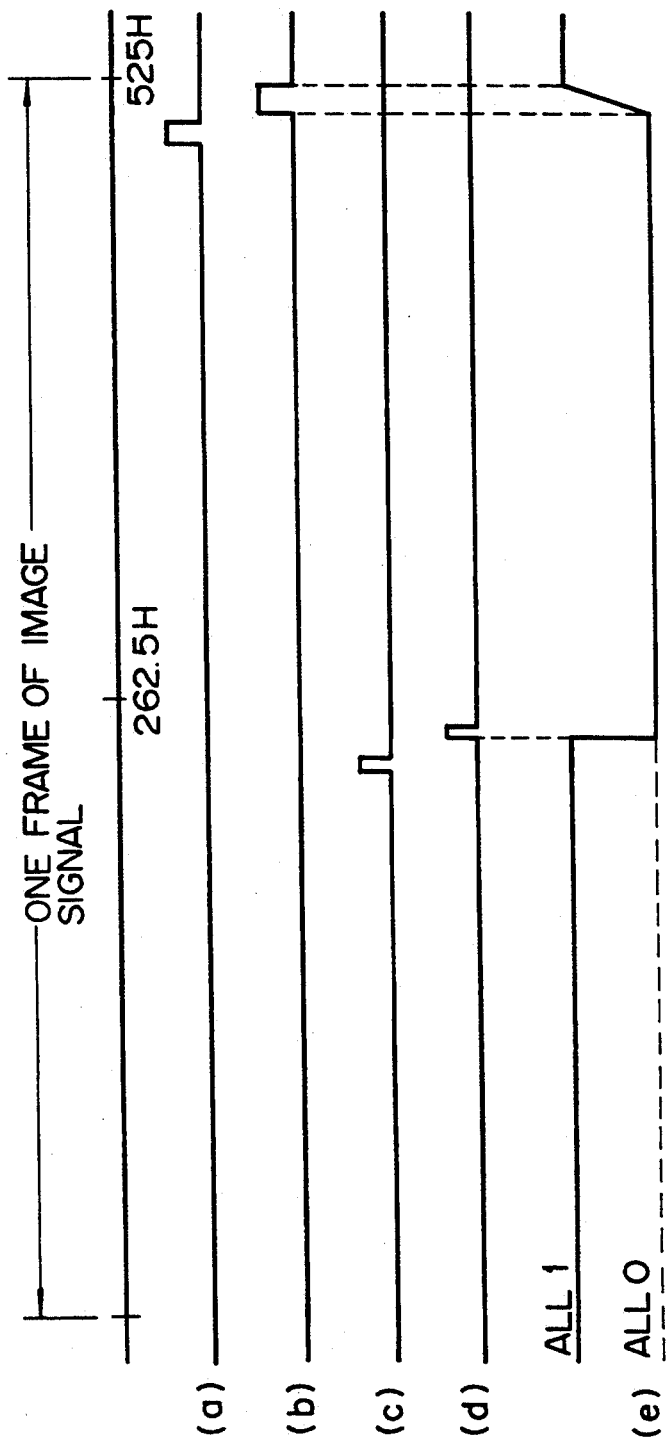
FIG. 5 is a timing chart to explain the phase control operation.

Next, description is given on the operation of phase control, referring to the timing chart of FIG. 5. For easier explanation, description is given on the operation of the count enable signal ENBL1 and clear signal CL1 only.

One frame of composite image signals is recorded for one rotation of the disk, i.e. for one track. Count enable signal (a) is generated by the timing generator circuit 11 within the predetermined range in this one frame. This is delayed by the delay circuit 12 and is turned to delay enable signal (b), and this is supplied to the phase counter 13. The phase counter 13 performs a counting operation when the delay enable signal (b) is at a high level as it is turned to count enable status. On the other hand, clear signal (c) is generated by the timing generator circuit 11 at the point deviated from the count enable signal (a) by one field (½ frame). This is delayed by the delay circuit 12 to be turned to the delay clear signal (d), and this is supplied to the phase counter 13. If the delay by the delay circuit 12 is not too much, there is no need to delay the clear signal (c). The count data on the phase counter 13 is cleared by the delay clear signal (d).

As the result, the count data (e) of the phase counter 13 indicated by analog is reset to 0 by the delay clear signal (d). When delay enable signal (b) is applied, it is increased by clock cycle. It is turned to a trapezoid wave maintaining all 1 until the next delay clear signal (d) is applied at the time it is turned to all 1. The inclined portion of the trapezoid wave of this count data (e) is synchronizing with the composite image signal to be recorded and becomes the timing axis reference signal generated at the predetermined position on the timing axis. Therefore, in case phase control is performed by this trapezoid wave, phase is pulled in at the inclined portion of the trapezoid wave. The resolution is:

$$\frac{N}{910} H (1H \approx 63.5 \ \mu sec)$$

as described above.

Next, description is given on the processing procedure of the recording mode and the reproduction seek mode executed by the processor of the system controller 30 in the disk recording and reproducing apparatus of such arrangement.

Figure 6:
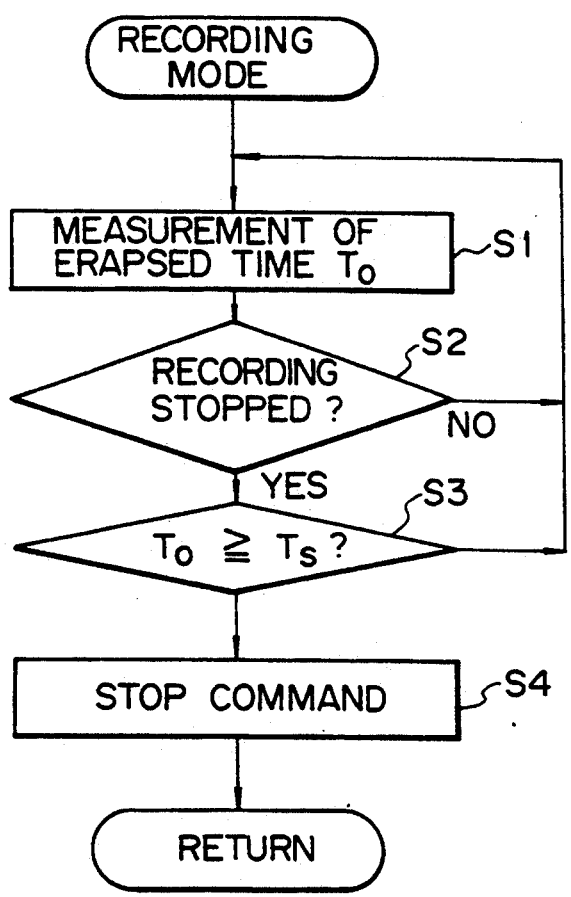
FIG. 6 is a flow chart of the processing procedure in the recording mode.

First, description is given on the processing procedure of the recording mode according to the flow chart of FIG. 6. It is supposed that this routine is called and executed at the time when the recording mode command is issued from the operation unit 31.

When entering the recording mode, the processor starts to measure the elapsed time To from the record starting time. Then, it judges whether or not the record stopping command has been issued from the operation unit 31 (Step S2). When it is judged that the record stopping command has been issued, it judges whether or not the elapsed time To from the record starting time is longer than the maximum seek time of the disk now in recording (Step S3). The maximum seek time Ts is about 200 msec on a 30 cm disk when NTSC signals are recorded. Because the time corresponding to one frame is about 33.37 msec, $$200 \div 33.37 \approx 6.$$

Accordingly, the maximum seek time Ts corresponds to 6 frames. When it is judged that the elapsed time To from the record starting time has reached more than the maximum seek time Ts, the processor issues the record stopping command and stops the recording operation (Step S4).

In such a recording mode, a series of information signals from the record starting point to the record stopping point are regarded as one group and recorded in a group unit. Recording is performed in such a manner that the minimum recording time for each group is longer the maximum seek time Ts. In the case where reproduction is performed by using a pair of heads alternately on the disk thus recorded, one of the heads never completes a reading operation before the seek operation of the other head is completed. Thus, the other head is always turned to the standby status to send out the next image information. Therefore, it is possible to continuously reproduce the image of any combination without interruption.

Next, the processing procedure of the reproduction seek mode in accordance with the flow chart of FIG. 7(a-b) is described. When in the reproduction seek mode, the desired image is continuously reproduced in any combination. It is assumed that the starting frame number Ns and the ending frame number Ne of the desired image are specified in advance on the operation unit 31 in the order of the reproduction. Also, it is assumed that the reproduction signal processing system of the disk recording and reproducing apparatus, for which this reproduction seek mode is executed, is furnished with frame memory.

The processor first issues the reproduction command to one of the heads to perform a reading operation and, at the same time, issues the seek command to the other head (Steps S11 and S12) to perform a seeking operation. Then, the output of head is changed to the reproduction head (Step 13). Next, the processor judges whether or not the block reproduction time (the time required for information reading of the specified block) obtained according to the starting frame number Ns and the ending frame number Ne stored in memory in advance for the specified block to be reproduced is longer than the maximum seek time Ts on the disk now being reproduced (Step S14). Because the time corresponding to one frame is about 33.37 msec, the block reproduction time Tp is obtained by the following equation:

$$Tp = (Ne - Ns) \times 33.37 \text{ msec.}$$

If Tp < Ts, the processor judges which of selections (N) 1-3 the user has selected on the operation unit 31 (Step S15).

In the case N=1, the processor judges whether or not the head in reproducing has reached the final frame of the specified block from the frame number obtained from the read signals (Step S16). If the final frame has been reached, a memory command is issued to store the reproduced image signal of the final frame in the frame memory (Step S17), and the read command is issued to read the stored image signal (Step S18). Thus, a still picture reproduction for the final frame is performed. The processor judges whether or not the reproduction elapsed time Tm from the time when reproduction command was issued in Step S11 is longer than the maximum seek time Ts on the disk now in reproducing (Step S19), and the still picture reproduction for the final frame is continued until Tm≧Ts. When Tm≧Ts, the processor issues the read stop command, and the still picture reproduction for final frame is completed (Step S20). Then, it judges whether the mode is completed by stop command, or by specified block completion (Step S21).

In the case N=2, the processor judges whether or not the head in reproducing has reached the final frame of the specified block (Step S22). If the final frame has been reached, a pause command is issued to repeatedly reproduce the frame (Step S23). Then, it is judged whether the reproduction elapsed time Tm is longer than the maximum seek time Ts on the disk now in reproduction (Step S24), and the pause operation is continued until Tm≧Ts. When Tm≧Ts, the processor issues a pause stop command (Step S25), and control is then shifted to the Step S21.

In the case N=3, the processors adds the adjacent block following the specified block as the block to be reproduced (Step S26). Next, it is judged whether or not the new block reproducing time Tpn with the added block is longer than the maximum seek time Ts on the disk now in reproduction (Step S27). Then, it continually adds adjacent blocks until Tpn≧Ts. When Tpn≧Ts, the processor judges whether or not the reproduction operation by one of the heads in reproducing has completed (Step S28). When the reproducing operation is completed, control is shifted to S21.

When it is judged that Tp≧Ts in the Step S14, the reproducing operation is continued, and control is shifted to Step S21 when the reproduction is completed. When it is judged that the mode is completed in Step S21, a series of reproduction seek mode is completed. If the mode commands are not completed, it is returned to Step S1, and the seek operation by one head and the reproduction by the other head are performed by the same procedure as above.

By such processing procedure, the time Tp, Tm or Tpn required for a single reproduction (reading) is always longer than the maximum seek time Ts. Therefore, when a disk is reproduced, in which the block (group) having the minimum recording time for each group shorter than the maximum seek time Ts is present, the reproduction time becomes longer than the maximum seek time Ts by a still picture reproduction of the final frame, a pause operation or by the addition of one or more adjacent blocks even when the reproduction of the block is specified. Thus, the seek operation of the other head is always completed during the reproducing operation, and it is turned to the standby status to send out the next image information. Accordingly, it is possible to continuously reproduce the image of any combination without interrupting. It goes without saying that the still picture reproduction (N=1) of the final frame can be applied only to the reproducing signal processing system provided with frame memory.

In the above embodiment, description has been given on the case where the reproduction seek mode is applied to the disk recording and reproducing apparatus, whereas it is also applicable to an apparatus exclusively used for reproduction.

As described above, in the disk reproducing and recording/reproducing apparatus according to the present invention, the recorded information is read by using a pair of heads alternately. When reproducing, the minimum reading time required for a single reading operation by a pair of heads is longer than the maximum seek time on the disk in reproducing. When recording, the minimum recording time for each group is longer than the maximum seek time on the disk in recording. In so doing, when one of the heads is in a reading operation, the seek operation of the other head is always completed, and it can be turned to the standby status to send out the next image information. Thus, it is possible to continuously reproduce the image of any combination without interruption.

What is claimed is:

1. A disk playing apparatus, comprising:
a pair of heads for reading recorded information from a disk, said pair of heads having first and second heads that alternately read said recorded information; and
a controller for commanding the first head to perform a reading operation by reading at least a first block of said recorded information for a reading time and the second head to perform a seeking operation by seeking a second block of said recorded information for a seeking time, said controller including means for determining a minimum value of said reading time and a maximum value of said seeking time, said controller maintaining said minimum reading time to be longer than the maximum seeking time through control of the pair of heads;

wherein said recorded information on said disc includes blocks of information, said first head reading at least a first block of information during the reading operation and said second head seeking a second block of information during the seeking operation;

said controller further comprising determining means for determining a reproduction time of a block of information currently being read by said first head and means for determining whether said reproduction time is longer than said maximum seeking time; and said determining means determining said reproduction time based upon a starting frame number and ending frame number of said currently read block of information.

2. A disk playing apparatus, comprising:

a pair of heads for reading recorded information from a disk, said pair of heads having first and second heads that alternately read said recorded information;

a controller for commanding the first head to perform a reading operation by reading at least a first block of said recorded information for a reading time and the second head to perform a seeking operation by seeking a second block of said recorded information for a seeking time, said controller including means for determining a minimum value of said reading time and a maximum value of said seeking time, said controller maintaining said minimum reading time to be longer than the maximum seeking time through control of the pair of heads, wherein said recorded information on the disc includes at least one block of information having first and final frames therein;

means for determining a reproduction time of a block of information currently being played based on said first and final frames, and means for determining whether or not said first head has reached said final frame of information in said block of information currently being played by said first head.

3. A disk playing apparatus as claimed in claim 2, said controller further comprising:

memory means for storing at least said final frame of said block of information currently being read by said first head, when said controller determines that said reproduction time of said currently read block is shorter than the maximum seeking time, and means for causing said first head to read repeatedly said final frame from said memory means until a time has elapsed since a start of said reading operation which is greater than or equal to said maximum seeking time.

4. A disk playing apparatus, as claimed in claim 2, said controller further comprising:

means for issuing a pause command to cause said first head to repeatedly reproduce a final frame of said currently read block, until a time has elapsed since a start of said reading operation which is greater than or equal to said maximum seeking time.

5. A disk playing apparatus according to claim 2, said controller further comprising:

means for commanding said first head to add continually new blocks of information from said recorded information on the disc to said block currently being read, until a cumulative reproduction time of said block currently being read and said added new blocks is greater than or equal to said maximum seeking time.

6. A disk recording apparatus, comprising:

a pair of heads for recording at least one series of information signals onto a disk during a recording operation by using one of said pair of heads, or by alternately using each of said pair of heads;

a processor for controlling said pair of heads during said recording operation to group information signals from said series of information signals into groups of information to be recorded by one of said pair of heads, said processor including means for determining a minimum value of a recording time for recording each group of information and a maximum value of a seeking time for performing said seeking operation of said disk, said processor maintaining the minimum recording time for each group to be longer than the maximum seeking time through control of said pair of heads;

means for measuring a time that has elapsed since a recording start time of said recording operation, means for determining whether or not a record stopping command has been issued to said pair of heads, and means for determining, when said record stopping command has been issued, whether or not said elapsed time is longer than said maximum seeking time.

7. A disk recording apparatus as claimed in claim 6, said processor further comprising:

means for stopping said recording operation when it is determined that said elapsed time exceeds said maximum seeking time.

* * * * *